United States Patent
Little (10) Patent No.: US 7,937,619 B2
(45) Date of Patent: May 3, 2011

(54) FINE GRAINED FAILURE DETECTION IN DISTRIBUTED COMPUTING

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 383 days.

(21) Appl. No.: 12/130,979

(22) Filed: May 30, 2008

(65) Prior Publication Data
US 2009/0300403 A1 Dec. 3, 2009

(51) Int. Cl.
*G06F 11/00* (2006.01)
(52) U.S. Cl. ............................................ 714/18; 714/45
(58) Field of Classification Search .................... 714/18, 714/4, 2, 25, 39, 45, 47, 48
See application file for complete search history.

(56) References Cited

U.S. PATENT DOCUMENTS

| | | | | |
|---|---|---|---|---|
| 7,689,567 B2 * | 3/2010 | Lock et al. | ............... | 707/999.01 |
| 2001/0034782 A1 * | 10/2001 | Kinkade | ...................... | 709/219 |
| 2006/0015512 A1 * | 1/2006 | Alon et al. | ..................... | 707/100 |
| 2007/0294493 A1 * | 12/2007 | Buah et al. | ..................... | 711/156 |
| 2008/0033900 A1 * | 2/2008 | Zhang et al. | ..................... | 706/52 |

OTHER PUBLICATIONS

Welch, Bob, et al., "A Resilient Application-Level Failure Detection System For Distributed Computing Environments", 0-8186-7075-4/95, Copyright 1995 IEEE, pp. 401-406.
King, Erik, "Perpetual Enterprise Management Service (PEMS) for Next Generation SOA-based Command & Control Systems", Jun. 2005, 26 pages.
King, Erik, "Perpetual Enterprise Management Service (PEMS) for C2 SOA Deployments", Jun. 14, 2005, 23 pages.

* cited by examiner

*Primary Examiner* — Dieu-Minh Le
(74) *Attorney, Agent, or Firm* — Blakely, Sokoloff, Taylor & Zafman LLP (57) ABSTRACT

A client sends a request message to a process hosted by a remote server via a middleware service, wherein the request message specifies a procedure for the process to execute. The client waits a predetermined time period to receive a response message from the process. If no response message is received within the predetermined time period, the client probes the process to determine why no response message has been received, wherein said probing reveals thread level information about the process.

21 Claims, 4 Drawing Sheets

FINE GRAINED FAILURE DETECTION IN DISTRIBUTED COMPUTING

TECHNICAL FIELD

Embodiments of the present invention relate to distributed computing systems, and more specifically to determining statuses of processes within a distributed computing system.

BACKGROUND

Distributed computing systems include multiple services and/or applications that operate on different machines (computing devices) that are connected via a network. Some services or applications may rely on other services and/or applications to operate. However, machines, and services and applications that operate on the machines, may occasionally become unavailable (e.g., when a machine loses power, an application crashes, a network connection to the machine is lost, etc.).

In some distributed computing systems, to determine which machines, services and applications are operative at a given time, each machine in the distributed computing system can periodically transmit status inquiry messages, which are typically referred to as "are-you-alive messages" or "heartbeat messages." The status inquiry message is a small control message that is generated and sent between machines or services on machines. A queried machine that receives the status inquiry message generates a status response message. The status response message is then sent back to the original querying machine that sent the status inquiry message. The querying machine can then receive the status response message, which provides confirmation that the queried machine and/or service is still active. Such status inquiry and status response messages may be continuously transmitted between machines within a distributed computing system at a specified frequency.

Conventional distributed computing systems can determine whether a machine or a service operating on a machine has failed. However, conventional distributed computing systems cannot detect failure at a fine grained level, such as failure of a container that houses a service or failure of individual threads within a service. Therefore, conventional distributed computing systems offer only course grained failure detection.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for determining statuses of fine grained components within a distributed computing system. In one embodiment, a client sends a request message to a process hosted by a remote server via a middleware service. The request message may specify a procedure for the process to execute, work to perform, etc. The client waits a predetermined time period to receive a response message from the process. If no response message is received within the predetermined time period, the client and/or the middleware service probes the process to determine why no response message has been received. By probing the process, the client and/or middleware service may determine thread level information about the process. For example, probing may reveal that a specific thread has failed, that a thread is still performing a requested operation, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "waiting", "searching", "causing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
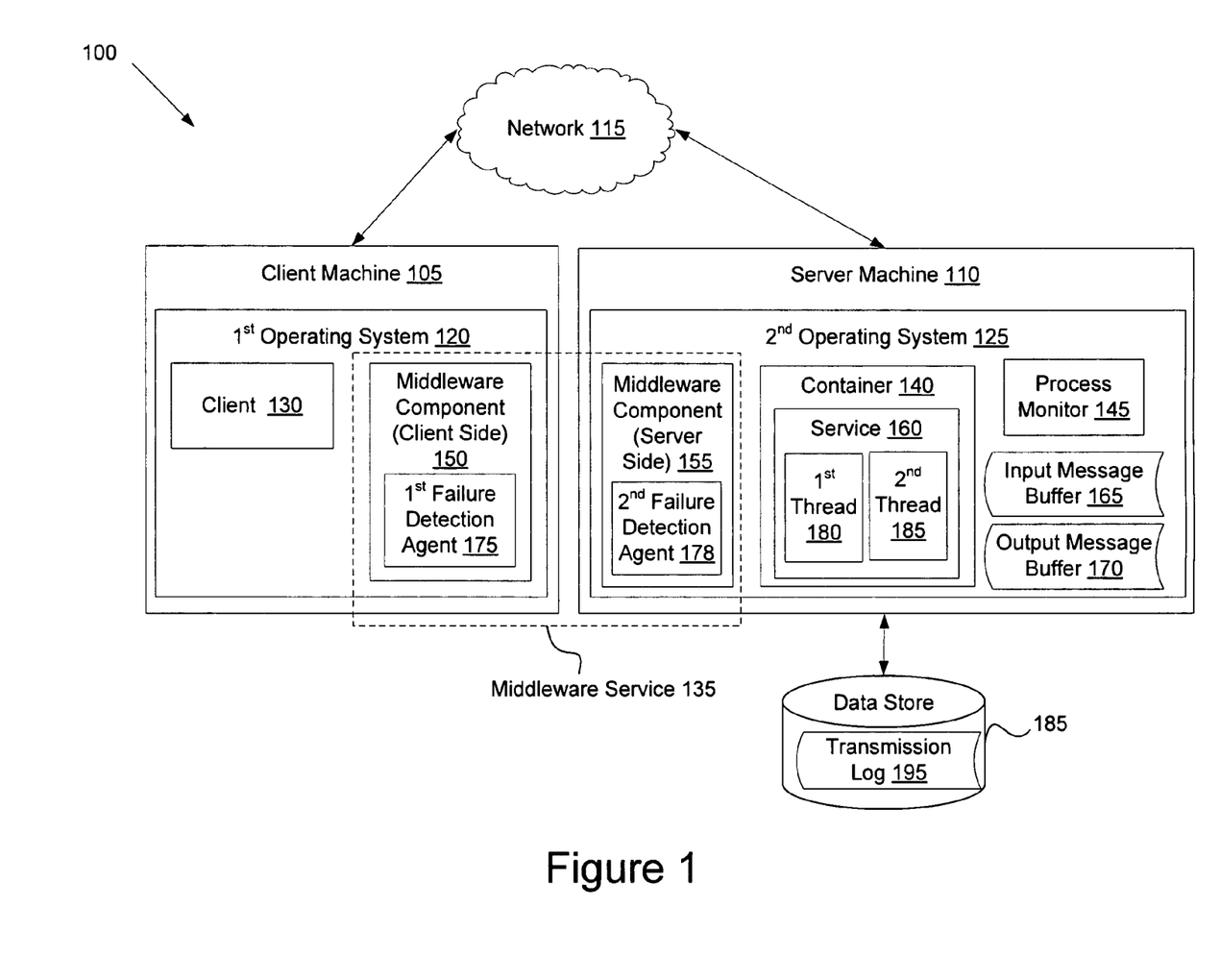
FIG. 1 illustrates an exemplary distributed computing system, in which embodiments of the present invention may operate.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 includes multiple machines (e.g., client machine 105 and server machine 110) connected via a network 115. The network 115 may be a public network (e.g., Internet), a private network (e.g., Ethernet or a local area Network (LAN)), or a combination thereof. In one embodiment, the network 115 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple buses, each of which may logically interconnect different services and/or clients.

Machines (e.g., client machine 105 and server machine 110) may be desktop computers, laptop computers, servers, etc. Each of the machines 105, 110 includes an operating system (e.g., first operating system 120 and second operating system 125) that manages an allocation of resources of the machine (e.g., by allocating memory, prioritizing system requests, controlling input and output devices, managing file systems, facilitating networking, etc.). Examples of operating systems that may be included in machines 105, 110 include Linux, UNIX, Windows®, OS X®, etc. Different machines may include different operating systems, and/or multiple machines may each include the same operating system. For example, first machine 105 and second machine 110 may each include Linux, or first machine 105 may include Linux and second machine 110 may include UNIX.

In one embodiment, first operating system 120 includes a client 130 and a client side middleware component 150. Client 120 may be an application that runs on a machine, and that accesses services. For example, client 130 may initiate procedures on service 160 that cause service 160 to perform one or more operations, and may receive the results of those procedures. The client side middleware component 150 is described in greater detail below.

In one embodiment, second operating system 125 includes a service 160 and a server side middleware component 155. The server side middleware component 155 is described in greater detail below. Service 160 is a discretely defined set of contiguous and autonomous functionality (e.g., business functionality, technical functionality, etc.) that operates on server machine 110. Service 160 may represent a process, activity or other resource that can be accessed and used by other services or clients on network 115. Service 160 may be independent of other services, and may be accessed without knowledge of its underlying platform implementation.

In an example for a business function of "managing orders," service 160 may provide, for example, the functionality to create an order, fulfill an order, ship an order, invoice an order, cancel/update an order, etc. Service 160 may be autonomous from the other services that are used to manage orders, and may be remote from the other services and have different a platform implementation. However, the service 160 may be combined with other services and used by one or more applications to manage orders.

In one embodiment, service 160 includes multiple threads of execution (e.g., first thread 180 and second thread 185). Each thread of execution (thread) may be assigned different commands, and may execute different procedures to perform different work. Each thread is only active while it is performing work, and otherwise resides in a thread pool. By using multiple threads, service 160 can perform two or more concurrent tasks. For example, on a multiprocessor system, multiple threads may perform their tasks simultaneously. This can allow service 160 to operate faster than it would operate if using only a single thread. In a further embodiment, first thread 180 is an active thread, and is associated with communication ports of server machine 110 and/or second operating system 125. First thread 180 receives and dispatches messages, and is responsible for spawning additional threads to handle work requests (e.g., requests to execute procedures, perform operations, etc.) when required. In this embodiment, second thread 185 is a thread that has been spawned to handle a work request received from client 130, and does not have access to communication ports.

In one embodiment, service 160 operates within a container 140. Container 140 is a component (e.g., a software component) that encapsulates business logic (e.g., logic that performs core concerns of an application or service). In one embodiment, container 140 is an application server. An application server handles most or all of the business logic and/or data access of an application or service (e.g., service 160). The application server enables applications and services to be assembled from components offered by the application server. Therefore, such applications and services may be assembled without a need to be programmed. This can simplify application development. An example of an application server is a Java Application Server (e.g., Java Platform Enterprise Edition (J2EE) Application Server).

Service 160 may store incoming messages in an input message buffer 165 and outgoing messages in an output message buffer 170. The input message buffer 165 and output message buffer 170 may be maintained in a volatile memory (e.g., random access memory (RAM), a nonvolatile memory (e.g., nonvolatile random access memory (NVRAM), a hard disk drive, etc.), or a combination thereof. Contents of the incoming message buffer and outgoing message buffer may also be included in a transmission log 195 stored in data store 185, which may be internal or externally connected with server machine 110. Data store 185 may be a hard disk drive, optical drive, solid state memory and/or tape backup drive.

In one embodiment, second operating system 125 includes a process monitor 145. Process monitor 145 monitors the activities of applications and services that are hosted by server machine 110. Process monitor 145 may gather operating statistics of applications and/or services. Process monitor 145 may also monitor each application and/or service to determine a current functionality of the monitored applications and/or services. The process monitor 145 can monitor file system, registry, process and thread information.

To facilitate networking, each operating system 120, 125 may include a middleware component (e.g., client side middleware component 150 and server side middleware component 155) that facilitates the exchange of messages between the client machine 105 and the server machine 110. The middleware components 150, 155 are components of a middleware service 135. The Middleware service 135 provides a layer of interconnection between processes, applications, services, etc. over network 115. For example, the middleware service 115 may enable client 130 to interact with service 160.

Examples of middleware services include remote procedure calls (RPC), message oriented middleware (MOM), object request brokers (ORB), enterprise service bus (ESB), etc. A remote procedure call (RPC) enables an application (e.g., client 130) to cause a subroutine or procedure to execute in an address space that is different from an address space in which the application is running. For example, a remote procedure call could permit client 130 to cause service 160 to execute a procedure (e.g., to perform one or more operations). Message oriented middleware (MOM) is a client/server infrastructure that allows an application to be distributed over multiple machines, each of which may be running the same or different operating systems. Object request brokers (ORB) enable applications to make program calls between machines over a network. The most common implementation of an ORB is the common object request brokerage architecture (CORBA). Enterprise service buses (ESB) are described above.

In one embodiment, the client side middleware component 150 includes a first failure detection agent 175, and the server side middleware component 155 includes a second failure detection agent 178. Middleware service 135 may provide failure detection capabilities via one or both of first failure detection agent 175 and second failure detection agent 178. In one embodiment, first failure detection agent 175 and second failure detection agent 178 perform both course grained failure detection and fine grained failure detection. Course grained failure detection may include detecting a status of server machine 110, second operating system 125 and/or service 160. Fine grained failure detection may include determining a status of container 140, first thread 180 and/or second thread 185. Fine grained failure detection may also include determining whether service 160 has received a request message, whether a thread within service 160 has processed the request message, whether the service 160 has sent a response message, etc.

First failure detection agent 175 and second failure detection agent 178 may operate independently or together. In one embodiment, some failure detection capabilities are provided by first failure detection agent 175, while other failure detection capabilities are provided by second failure detection agent 178. For example, some failure detection capabilities may only be performed by a failure detection agent that is external to a machine that hosts a process that is of concern, while other failure detection capabilities may only be provided by a failure detection agent that is hosted by the same machine that hosts the process that is of concern. Therefore, if service 160 is the process of concern, then first failure detection agent 175 may, for example, be able to detect whether server machine 110 and/or second operating system 125 are operable, while second failure detection agent 178 may not have such a capability. Alternatively, all failure detection capabilities may be provided by each failure detection agent.

The middleware service 135 may perform failure detection on behalf of client 130. In one embodiment, failure detection is performed upon request from client 130. Such a request may be received from client 130 if client 130 has failed to receive a response from service 160 after sending a request message to service 160. Alternatively, middleware service 135 may automatically initiate failure detection. In one embodiment, failure detection is initiated a predetermined period of time after a message is sent from client 130 to service 160.

In one embodiment, middleware service 135 is configured to probe a process to determine information about the process. Such probes may be generated and/or sent by failure detection agents 175, 178. Probes can be used to determine why client 130 has not yet received a response message from service 160. Probes may be directed to container 140, service 160, and/or process monitor 125. A probe directed to container 140 may request information regarding whether the container 140 is functioning properly and/or whether a process running within container (e.g., service 160) is functioning properly. A probe directed to service 160 may request information regarding whether service 160 is still functioning properly and/or whether threads of service 160 are still functioning properly. A probe directed to process monitor 145 may request information regarding a status of container 140, service 160, first thread 180 and/or second thread 185. The probe message may identify the process ID of the container 140 and/or service 160, and may further identify the thread ID of the first thread and/or second thread. Based upon an outcome of the probe, middleware service 135 may elect to continue to wait for a response, retransmit the request message, cause service to retransmit a response message, terminate a thread spawned to perform operations for client, or perform other actions.

In one embodiment, middleware service 135 scans the input message buffer 165 (e.g., by sending a probe message to service 160 that causes it to examine the input message buffer 165) to determine if a message from client 130 was ever received by service 160. Likewise, the middleware service 135 may scan the output message buffer 165 (e.g., by sending a probe message to service 160 that causes it to examine the output message buffer 170) to determine if the service 160 ever sent a response message to client 130. This may enable middleware service 135 to determine whether any message delivery failures prevented client 130 from receiving a response message from service 160. If, for example, it is determined that the service 160 never received the request message, middleware service 135 may resend the request message. If it is determined that service 160 sent a response message, but the response message was not received by client 130, middleware service 135 may cause service 160 to resend the response message. In another embodiment, middleware service 135 probes the transaction log 195 to determine whether service 160 has sent or received specific messages.

In one embodiment, middleware service 135 generates two different levels of probes, each of which consists of one or more probe messages. First level probes relate to message delivery, and second level probes relate to thread liveness (whether a thread has failed, is in an infinite loop, is still performing work, etc.). These two probing mechanisms can be used separately or in parallel. For example, a first level probe and a second level probe may be sent concurrently. Alternatively, a second level probe may only be sent if no responses have been received after sending the first level probe. In one embodiment, second level probes are used after a predetermined number of first level probes have failed.

First level probes are used to determine whether there were any problems in message delivery. First level probe messages may be sent to service, or to another process that has access to service's 160 input message buffer 165 and output message buffer 170. Alternatively, the first level probe message may be sent to data store 185 to scan transaction log 195 to determine whether the request message was received or a response message was sent.

First level probes may be used to determine whether a request message was received by the service and whether the service sent a response message. First level probes may be probe messages that include the original request message and/or that request information regarding the fate of the original request message. In one embodiment, the first level probe message includes instructions that cause the service 160 to check the input message buffer 165 and/or the output message buffer 170 to discern whether the request message was received or a response message was sent. If it is determined that the request message as not received, middleware service 135 may resend the request message. If it is determined that the response message was sent, the probe message may cause service 160 to resend the response message.

Second level probes are used to determine the liveness of individual threads within service 160. In one embodiment, a second level probe includes a message that is sent to service 160 requesting information about individual threads of service 160. The service 160 may then reply with information about the queried threads. In another embodiment, the second level probe includes a message sent to an external agent, such as process monitor 145. In some instances, such as where service 160 is in an infinite loop, the service 160 may not be able to respond to probe messages. In such an instance, the external agent can be used to determine thread liveness information.

In one embodiment, in which a reliable message delivery protocol is implemented (e.g., TCP/IP), first level probes are not used. Such message delivery protocols guarantee that communication endpoints will be informed of any communication failures. This involves the protocol itself sending periodic low-level "are you alive" probe messages. As such, first level probe messages may not be necessary, as the information gathered by such probe messages can be implicit in the message delivery protocol. However, reliable message delivery protocols do not determine thread level information such as thread liveness. Therefore, second level probes may still be used to determine thread liveness. For example, where service 160 includes a single communication thread, the "are you alive" probe messages sent by the message delivery protocol would only determine whether the communication thread is alive. Second level probes would still be necessary to determine the liveness of other threads.

In conventional distributed systems, if no response message is received the request message would be resent numerous times, and the middleware service 135 and/or client 130 would wait a predetermined time after each delivery attempt. Only after repeated failures to receive a response would the conventional distributed system determine that the service 160 has failed. By using probe messages for fine grained failure detection, the middleware service 135 and/or client 130 may determine whether the service 160 is functional, whether it has received the request message, whether individual threads within the service 160 are functional etc. in a reduced time frame. This can also reduce the number of resend attempts, which minimizes network traffic.

In one embodiment, in which the middleware service is an RPC, probe messages are a specialized form of RPC with specific parameters. As such, a probe primitive may occur at the same level as the RPC (which includes a send primitive that is used to request the transmission of messages and a receive primitive that is used to collect messages). This allows components that generate the probe messages to sit directly on the message passing layer. In one embodiment, first failure detection agent 175 and second failure detection agent 178 sit on the message passing layer.

In one embodiment, the container 140 operates within a virtual machine (e.g., the Java Virtual Machine). In such an embodiment, middleware service 135 may also probe the virtual machine to determine whether the virtual machine has failed. The virtual machine may include multiple containers, each of which may be probed by middleware service 135. Additionally, each virtual machine may include an additional operating system running within it, and the operating system may include multiple containers. Middleware service 135 may probe each of these components to determine whether they are operational. In one embodiment, middleware service 135 communicates with an additional process monitor within the virtual machine to determine status information of containers, services and/or threads that operate within the virtual machine.

In one embodiment, service 160 is configured to periodically inform client and/or middleware service of a current status of work being performed for client. Such periodic updates may identify operations that have already been performed, operations that are to be performed, and an estimated time to completion. Such periodic updates may also identify whether a response message has already been sent, whether a thread executing the procedure has failed, or other additional information. As long as periodic updates are received, there may be no need to send probe messages. If an expected periodic update is not received, middleware service 135 may then probe service 160.

Figure 2:
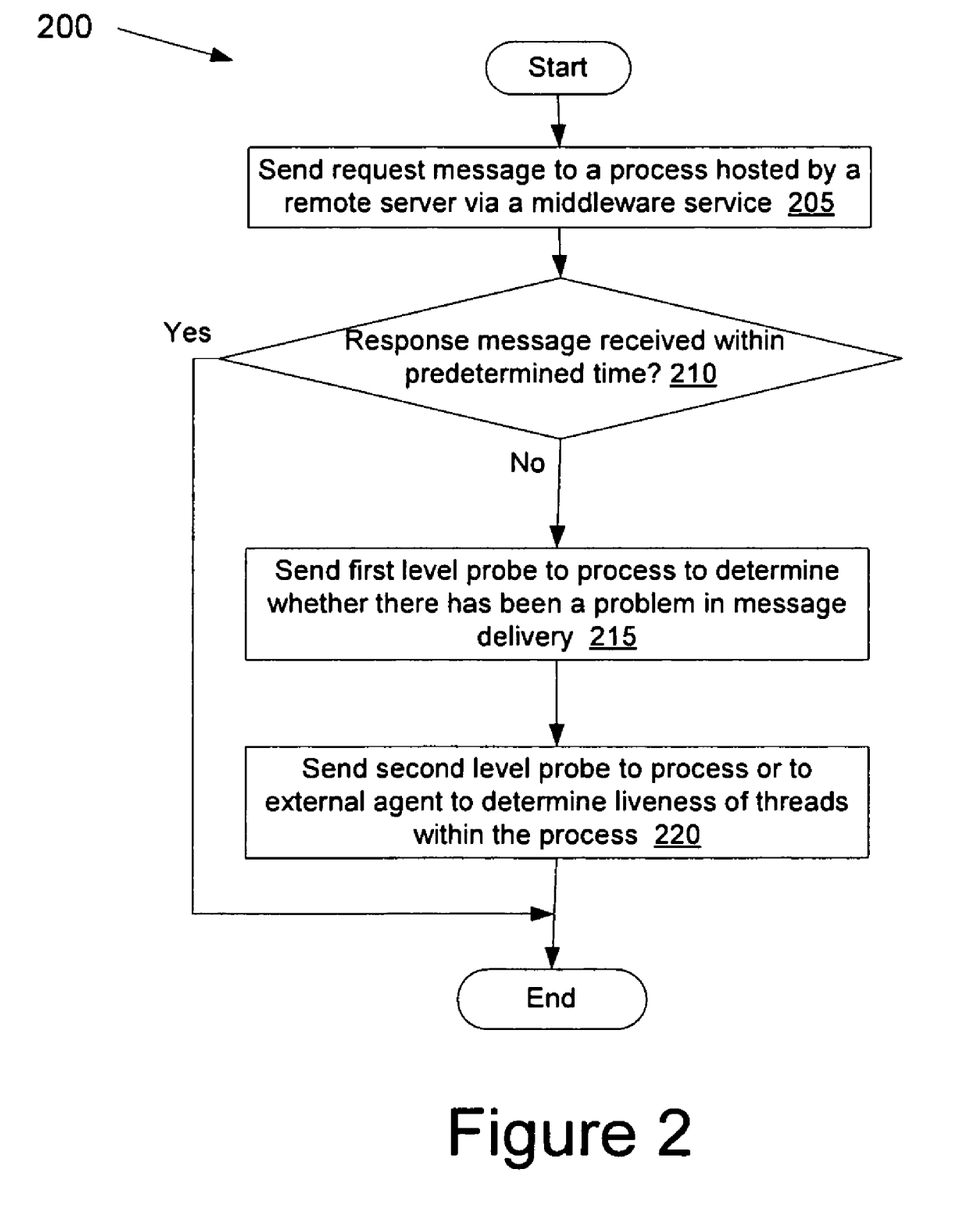
FIG. 2 illustrates a flow diagram of one embodiment for a method of performing fine grained failure detection.

FIG. 2 illustrates a flow diagram of one embodiment for a method 200 of performing fine grained failure detection. The method may be performed by processing logic that may comprise hardware (e.g., circuitry, dedicated logic, programmable logic, microcode, etc.), software (such as instructions run on a processing device), or a combination thereof. In one embodiment, method 200 is performed by a machine of distributed computing system 100 of FIG. 1. In a further embodiment, the method 200 is performed by a middleware service 135 (e.g., by a failure detection agent(s) 175, 178 of middleware service 135) and/or a client 130 of FIG. 1.

Referring to FIG. 2, at block 205 processing logic sends a request message to a process hosted by a remote server via a middleware service. For example, a client may send a request message to a service. At block 210, processing logic determines whether a response message has been received within a predetermined time. Such a determination may be made, for example, by the client or by the middleware service. If a response message is received within the predetermined time, then the method ends. If no response message is received within the predetermined time, then the message proceeds to block 215.

At block 215, processing logic sends a first level probe to the process to determine whether there has been a problem in message delivery and/or to resolve any problems in message delivery. In one embodiment the first level probe is simply a resend of the original request message. In another embodiment, the first level probe is an explicit probe message sent to determine the fate of the original request message. Alternatively, the first level probe may include both an explicit probe message sent to determine the fate of the original message and a resend of the original request message. The explicit probe message may include instructions that cause a recipient to search through its input message buffer to determine whether the original request was received. The probe message may also cause the recipient to check an output message buffer to search for a reply message that corresponds to the request message. The first level probe message may cause the process to perform an appropriate action after searching the input buffer and/or output buffer. For example, if a response message is found in the output message, the probe message may cause the process to resend the response message.

At block 220, processing logic sends a second level probe to the process or to an external agent (e.g., a process monitor) to determine the liveness of threads within the process. In one embodiment, a second level probe causes the process or external agent to check the status of a specific thread that was spawned to perform work identified in the request message. If the specific thread is not responsive, then the specific thread may be terminated and/or a new thread may be spawned to perform the work. The process may also send back a caution message, indicating that the original thread failed. The caution message may be useful, for example, in error checking. For example, if the thread became nonresponsive due to a programming bug, then the error may recur. If a caution message is repeatedly received when specific work is requested, this may indicate a programming bug.

If the process fails to respond to the first level probe message, the original request message, and/or a second level probe message sent to the process, then it may be either that the process has failed or that the threads have gone deaf (e.g., gone into an infinite loop). In such an occurrence, only an external agent can determine the reason that the service has failed to respond. If the external agent fails to respond, then it may be assumed that a machine and/or operating system hosting the process has failed. If the external agent determines that the process is not responding, then the external agent may terminate the process. The external agent may then notify processing logic that the process was terminated.

Figure 3:
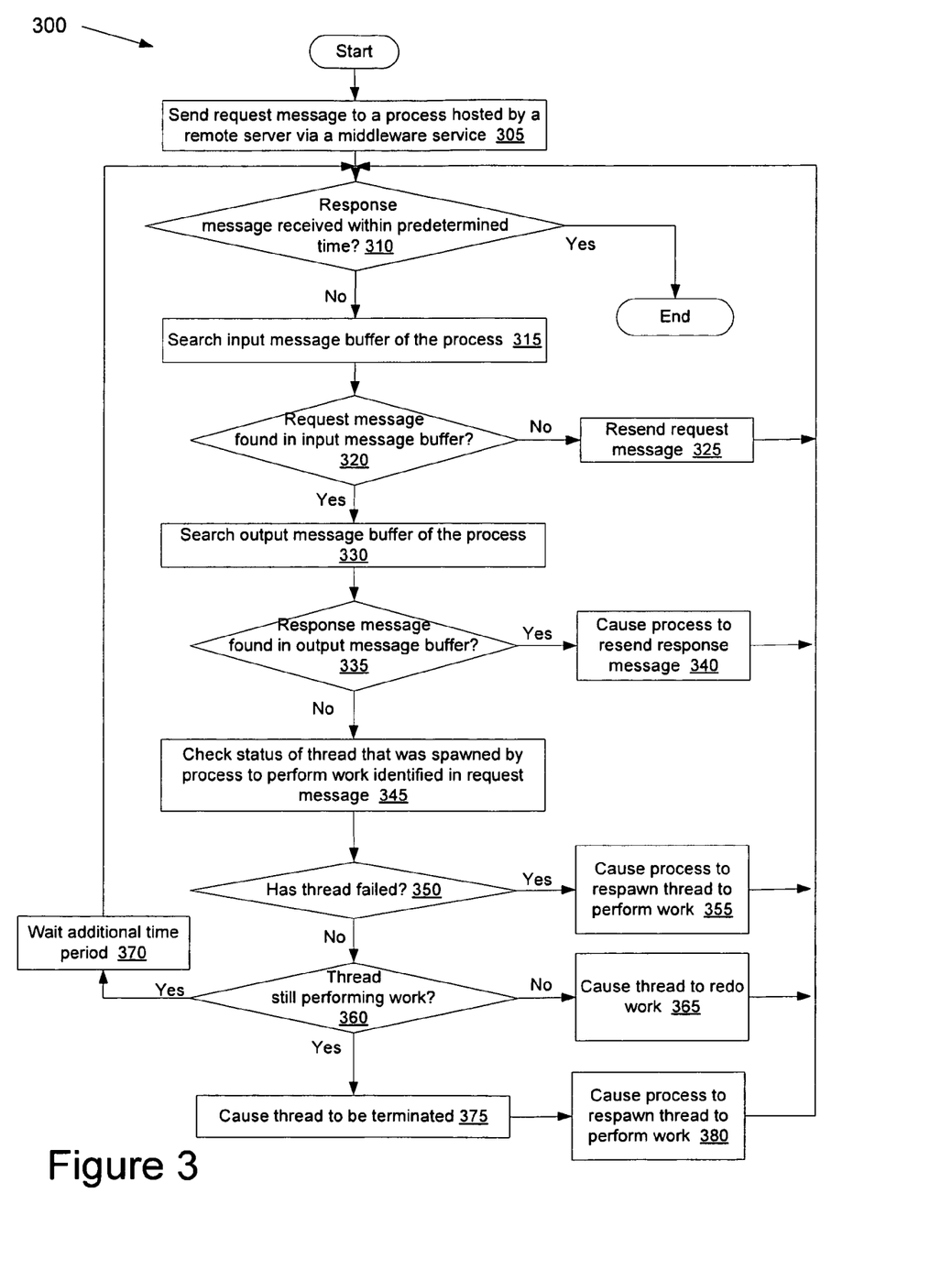
FIG. 3 illustrates a flow diagram of another embodiment for a method of performing fine grained failure detection.

FIG. 3 illustrates a flow diagram of another embodiment for a method 300 of performing fine grained failure detection. The method may be performed by processing logic that may comprise hardware (e.g., circuitry, dedicated logic, programmable logic, microcode, etc.), software (such as instructions run on a processing device), or a combination thereof. In one embodiment, method 300 is performed by a machine of distributed computing system 100 of FIG. 1. In a further embodiment, the method 300 is performed by a middleware service 135 (e.g., by failure detection agent(s) 175, 178 of middleware service 135) and/or a client 130 of FIG. 1.

Referring to FIG. 3, at block 305 processing logic sends a request message to a process hosted by a remote server via a middleware service. For example, a client may send a request message to a service. At block 310, processing logic determines whether a response message has been received within a predetermined time. Such a determination may be made, for example, by the client or by the middleware service. If a response message is received within the predetermined time, then the method ends. If no response message is received within the predetermined time, then the message proceeds to block 315.

At block 315, processing logic searches an input message buffer of the process. In one embodiment, the search is performed by sending a probe message (e.g., a first level probe message) to the process. The probe message may cause the process to search its input message buffer. The process may then send a result of the search back to processing logic (e.g., back to middleware service and/or a client).

At block 320, processing logic determines whether the request message was found in the input message buffer. If the request message was found in the input message buffer, this indicates that the request message was received by the process. If the request message was not found in the input message buffer, this indicates that an error occurred in transmission of the request message. If the request message was not found in the input message buffer, then the method proceeds to block 325. Otherwise, the method proceeds to block 330.

At block 325, processing logic resends the request message. The method then returns to block 310 to wait for a response message.

At block 330, processing logic searches an output message buffer of the process. In one embodiment, the search is performed by sending a probe message (e.g., a first level probe message) to the process. The probe message may cause the process to search its output message buffer. The process may then send a result of the search back to processing logic (e.g., back to middleware service and/or a client).

At block 335, processing logic determines whether a response message was found in the output message buffer. If a response message was found in the output message buffer, this indicates that the response message was generated by the process. If the response message was not found in the input message buffer, this indicates that for some reason a response message has not yet been generated. If the response message was not found in the output message buffer, then the method proceeds to block 345. Otherwise, the method proceeds to block 340.

At block 340, processing logic causes the process to resend the response message. In one embodiment, the probe message includes instructions that cause the process to resend the response message if the response message is found in the output message buffer. The method then returns to block 310 to wait for the response message.

At block 345, processing logic checks the status of a thread that was spawned by the process to perform work in response to receiving the request message (e.g., to execute a procedure identified in the request message). In one embodiment the status of the thread is checked by sending a probe message (e.g., a second level probe message) to the process. In another embodiment, the status of the thread is checked by sending a probe message to an external agent such as a process monitor. The process or external agent may then reply with a message indicating a current status of the thread.

At block 350, processing logic determines whether the thread has failed. If thread has failed, then the method proceeds to block 355. If the threat has not failed, then the method proceeds to block 360.

At block 355, processing logic causes the process to respawn a thread to perform the work requested in the request message (e.g., to execute a procedure and/or perform one or more operations). In one embodiment, the probe message includes instructions that cause the process to respawn the thread. The method then returns to block 310.

At block 360, processing logic determines whether the thread is still performing work (e.g., still executing a procedure, performing an operation, etc.). If the thread is no longer performing work requested in the request message, then the method proceeds to block 365 and processing logic causes the thread to redo the work (e.g., to reexecute a procedure or operation). The method then returns to block 310.

The most common reason that a response message is not received within a predetermined time period is that the sender has underestimated the time that it will take the receiving process to execute the work required. Therefore, if the thread is still performing work at block 360, then the method may continue to block 370 and processing logic may wait an additional amount of time for the response message. The method then returns to block 310. However, a thread may also still be performing work because the thread has gone into an infinite loop or has otherwise stopped responding. In such an instance the thread may never complete the work. Therefore, if the thread is still performing work, the method may continue to block 375 and processing logic may cause the thread to be terminated. The method then may continue to block 380, and processing logic may cause the process to respawn the thread to perform the work. The method then returns to block 310.

Figure 4:
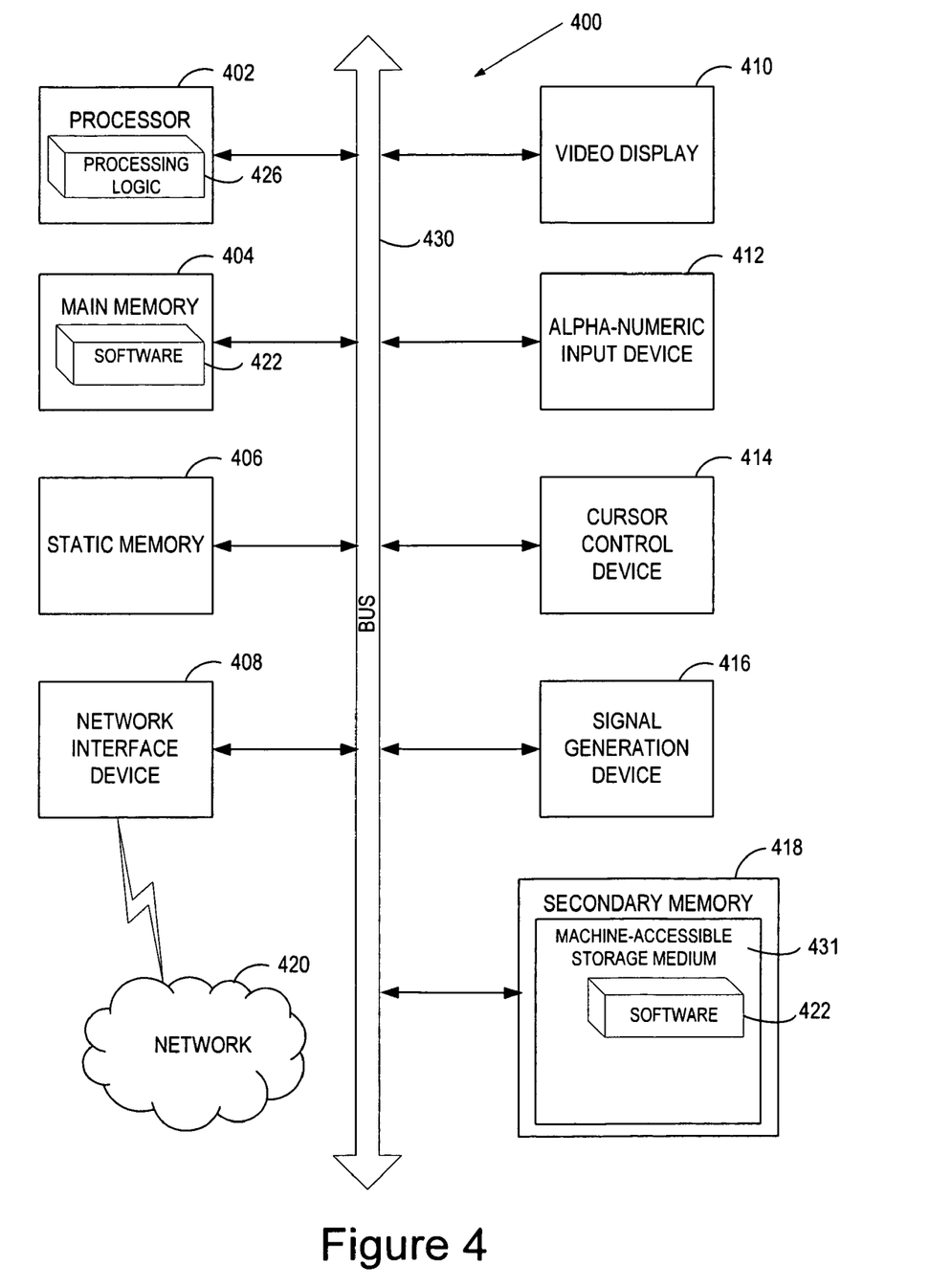
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store middleware components (e.g., client side middleware component and/or server side middleware component) of FIG. 1, and/or a software library containing methods that call the middleware components. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method, comprising:
sending a request message to a process hosted by a remote server via a middleware service, wherein the request message specifies a procedure for the process to execute;
waiting a predetermined time period to receive a response message from the process; and
if no response message is received within the predetermined time period, probing the process to determine why no response message has been received, wherein said probing reveals thread level information about the process, the probing comprising at least one of searching an input message buffer of the process to determine whether the request message was received by the process or searching an output message buffer of the process to determine whether the response message was sent by the process.

2. The method of claim 1, further comprising:
if the request message was not received by the process, resending the request message.

3. The method of claim 1, further comprising:
if the response message was sent, causing the process to resend the response message.

4. The method of claim 1, wherein the process is a multi-threaded process and wherein probing the process includes checking a status of a thread that was spawned by the process to execute the procedure.

5. The method of claim 4, further comprising:
causing the process to spawn a new thread to execute the procedure if the thread has failed.

6. The method of claim 4, further comprising:
if the thread is still executing the procedure, performing one of waiting an additional time period to receive the response message or causing the thread to be terminated.

7. The method of claim 1, further comprising:
receiving periodic updates regarding a current state of a thread that is executing the procedure from at least one of the process or an external agent that monitors the process.

8. The method of claim 1, further comprising:
sending a first level probe message to the process to determine whether there have been problems in message delivery; and
sending a second level probe message to at least one of the process or an external agent to determine liveness of threads within the process.

9. A computer readable storage medium including instructions that, when executed by a processing system, cause the processing system to perform a method comprising:
sending a request message to a process hosted by a remote server via a middleware service, wherein the request message specifies a procedure for the process to execute;
waiting a predetermined time period to receive a response message from the process; and
if no response message is received within the predetermined time period, probing the process to determine why no response message has been received, wherein said probing reveals thread level information about the process, the probing comprising sending a first level probe message to the process to determine whether there have been problems in message delivery and sending a second level probe message to at least one of the process or an external agent to determine liveness of threads within the process.

10. The computer readable storage medium of claim 9, the method further comprising:
searching an input message buffer of the process to determine whether the request message was received by the process; and
if the request message was not received by the process, resending the request message.

11. The computer readable storage medium of claim 9, the method further comprising:
searching an output message buffer of the process to determine whether the response message was sent by the process; and
if the response message was sent, causing the process to resend the response message.

12. The computer readable storage medium of claim 9, wherein the process is a multi-threaded process and wherein probing the process includes checking a status of a thread that was spawned by the process to execute the procedure.

13. The computer readable storage medium of claim 12, the method further comprising:
causing the process to spawn a new thread to execute the procedure if the thread has failed.

14. The computer readable storage medium of claim 12, the method further comprising:
if the thread is still executing the procedure, performing one of waiting an additional time period to receive the response message or causing the thread to be terminated.

15. The computer readable storage medium of claim 9, the method further comprising:
receiving periodic updates regarding a current state of a thread that is executing the procedure from at least one of the process or an external agent that monitors the process.

16. A computing apparatus comprising:
a processing device to execute instructions for a client from a memory, the client to generate a request message, to invoke a middleware component, and to pass the request message to the middleware component, wherein the request message specifies a procedure for a process to execute, the process being hosted by a remote server; and
the processing device to execute instructions for the middleware component from the memory, the middleware component to send the request message to the process, to wait a predetermined time period to receive a response message from the process, and if no response message is received within the predetermined time period, to probe the process to determine why no response message has been received, wherein said probing reveals thread level information about the process, the probing comprising at least one of searching an input message buffer of the process to determine whether the request message was received by the process or searching an output message buffer of the process to determine whether the response message was sent by the process.

17. The computing apparatus of claim 16, wherein the middleware component to resend the request message if the request message was not received by the process.

18. The computing apparatus of claim 16, wherein the middleware component to cause the process to resend the response message if the response message was sent.

19. The computing apparatus of claim 16, wherein the process is a multi-threaded process, further comprising:
the middleware component including a failure detection agent to check a status of a thread that was spawned by the process to execute the procedure, and to cause the process to spawn a new thread to execute the procedure if the thread has failed.

20. The computing apparatus of claim 16, wherein probing the process includes sending a first level probe message to determine whether there have been problems in message delivery and a second level probe message to determine liveness of threads within the process.

21. The computing apparatus of claim 16, further comprising:
a failure detection agent to receive periodic updates regarding a current state of a thread that is executing the procedure from at least one of the process or an external agent that monitors the process.

* * * * *